US005572006A

United States Patent [19]
Wang et al.

[11] Patent Number: 5,572,006
[45] Date of Patent: Nov. 5, 1996

[54] AUTOMATIC EXPOSURE SINGLE FRAME IMAGING SYSTEMS

[75] Inventors: Ynjiun P. Wang; Paul P. Ju, both of Fort Myers, Fla.

[73] Assignee: Metanetics Corporation, Fort Myers, Fla.

[21] Appl. No.: 280,489

[22] Filed: Jul. 26, 1994

[51] Int. Cl.⁶ ....................................................... B06K 7/10
[52] U.S. Cl. ............................................ 235/454; 235/462
[58] Field of Search .................................... 235/462, 472, 235/454, 455, 467; 348/229, 362

[56] References Cited

U.S. PATENT DOCUMENTS

| 4,409,470 | 10/1983 | Shepard et al. | 235/472 |
| 5,308,966 | 5/1994 | Danielson et al. | 235/472 |
| 5,349,172 | 9/1994 | Roustaei | 235/472 |
| 5,420,635 | 5/1995 | Konishi et al. | 348/229 |

FOREIGN PATENT DOCUMENTS

| 63-67692 | 3/1988 | Japan | 235/462 |
| 0083886 | 4/1988 | Japan | 235/462 |

Primary Examiner—Donald T. Hajec
Assistant Examiner—Thien Minh Le
Attorney, Agent, or Firm—Kenneth P. Robinson

[57] ABSTRACT

An automatic exposure imaging system operating on a single frame image capture basis is adapted for single chip CMOS type construction. For reading dataforms, such as two-dimensional bar codes and matrix codes, the system can provide automatic gain control, automatic exposure control, automatic focus sensing and single frame imaging and decoding, with reduced power consumption. A fixed focus distance sensor element array assembly and optical distance sensing enable automatic initiation of exposure when the image is in-focus. Exposure provided by image illuminators is automatically controlled by sensing of the cumulative level of reflected light during the exposure period. Alternatively, exposure time is determined from a look-up table, based upon the level of light reflected during an initial illumination period of fixed duration. Automatic system turn-off or re-reading can be provided, depending upon whether a dataform is successfully decoded. Power use is reduced by terminating the reading of sensor elements upon successful decoding. A complete, light-weight, hand-held reader is described, including provision for transmission of decoded dataform information and a wide range of additional capabilities via plug-in cards. Related methods are also described.

55 Claims, 5 Drawing Sheets

AUTOMATIC EXPOSURE SINGLE FRAME IMAGING SYSTEMS

This invention relates to systems and methods for reading dataforms, such as bar codes and matrix codes, and more generally to imaging systems employing sensor arrays for single frame capture of an image and which may provide automatic exposure, automatic gain control and automatic focus sensing.

BACKGROUND OF THE INVENTION

While a variety of types of sensor array scanners have been provided for reading more complex forms of two dimensional bar-codes and matrix codes, these sensor array scanners are all continuous frame scanners and therefore suffer from high power consumption. Because many sensor array scanners are portable and powered by batteries, there exists a need for a portable reader with single frame capability and therefore reduced power consumption and correspondingly extended battery life. There also exists a need for a portable reader with enhanced accuracy and reliability, as well as reduced size and light weight.

BACKGROUND OF DATAFORMS

The application and use of bar codes and matrix codes are well known and growing. Bar codes and matrix codes are forms of "dataforms", which for present purposes are defined to include all arrangements whereby data is fixed in some form of machine readable copy. Thus, dataforms include one and two dimensional bar codes, matrix codes and graphic codes, as well as words and numbers and other symbols, which may be printed or etched on paper, plastic cards and metallic and other items. Dataforms may be printed in invisible ink, magnetically recorded via magnetic stripes or magnetic ink fonts, electromagnetically recorded via RF tags, engraved, stamped, tattooed (on skin), formed by ion doping (for semiconductor wafers) or biochemical binding, etc.

In the utilization of dataforms, data originally encoded is recovered for further use in a variety of ways. For example, a printed bar code may be optically scanned to derive reflectance values which are digitized, stored in buffer memory and subsequently decoded to recover the data encoded in the bar code. Regardless of the particular type of dataform, an image is typically acquired and stored as pixel values for further processing. An image of a bar code or matrix code existing as a graphic image can be acquired by use of a CCD scanner, a laser scanner or other suitable device which is capable of distinguishing between different reflective values of light reflected from a dataform. Thus, for example, a bar code typically comprises black or dark colored bar type elements printed on a white or light colored background area, with white or light colored spaces between the elements of the bar code. The spaces are typically the same color as the background area, but may be of a different light color in this example. In other examples the elements of a bar code or matrix code are white or light colored and are defined by black or darker colored spaces and background area.

In other applications, such as laser engraving on silicon wafers, illumination may result in a dark on light relationship in one orientation and a light on dark relationship in a different orientation, In addition to pixel values representing reflective values of light ("light" being defined as encompassing the entire electromagnetic spectrum for present purposes), in other arrangements pixel values representative of reflective values may be based upon reflection of sound waves or other mediums from a dataform of an appropriate configuration. In any arrangement in which a dataform is arranged to be read on the basis of reflective values, such reflective values may typically be stored as pixel values in an image buffer memory or other storage medium in bit map or other form which, while representative of pixel values for an image, may utilize any appropriate data storage format.

BACKGROUND OF SENSOR ARRAY READERS

As noted, prior arrangements for reading dataforms have been based upon laser or continuous frame CCD scanners adapted for use with two-dimensional bar codes. However, these approaches have generally been subject to one or more limitations in the quest for a practical, low power consumption, low cost, light weight hand-holdable reader providing fast and accurate reading of two-dimensional dataforms. For example, a continuous frame reader typically consumes a full watt of power because the continuous frame architecture requires that the sensor array continuously produces a stream of image data. When a microprocessor decodes a bar-code, it merely selects appropriate data to decode from the continuous stream of image data.

Full frame progressive scan CCD devices, as proposed for continuous frame transfer video or very high resolution still photograph capture, are subject to one or more of high cost, bulky configuration, high power consumption and slow gain control response time. Such factors limit applicability to practical hand-held dataform reading applications.

Objects of the present invention are, therefore, to provide new and improved dataform readers avoiding one or more disadvantages of prior arrangements.

Further objects are to provide imaging systems capable of providing one or more of the following:

overall low power consumption;

single frame image capture;

automatic exposure control;

rapid automatic gain control;

automatic focus sensing and reading activation;

light weight hand-holdable configuration; and single chip configuration capability.

SUMMARY OF THE INVENTION

In accordance with the invention, an automatic exposure imaging system, such as a dataform reader to read a dataform in a target area, includes a plurality of sensor elements. The sensor elements are readable to provide image signals and at least some of such elements are positioned in a two-dimensional array. An optical filter transmissive to illumination from an exposure illuminator and effective to reduce transmission in other portions of the ambient light spectrum may be positioned in front of the array. A pair of focus illuminators are arranged to each illuminate the target area with an area of illumination characterized by at least one of a size, brightness, and location which varies with the distance between the dataform reader and the target area.

A reading cycle is initiated by a user trigger device arranged to activate the focus illuminators and initiate reading of selected sensor elements. An in-focus sensing device, responsive to image signals provided from a plurality of sensor elements, is arranged to provide an "in-focus"

signal when such area of illumination is characterized by at least one of (a) a size within a predetermined size range, (b) a brightness within a predetermined brightness range, and (c) a location within a predetermined location range. A gain control device is arranged to be responsive, in a period after said in-focus signal, to the level of reflected light as represented by image signals from at least one of the sensor elements, so as to control image signal amplification.

An exposure control device, responsive to image signals from at least one of the sensor elements, is arranged to provide a "start" signal in response to said in-focus signal and a "stop" signal, in response to reflection of a predetermined level of illumination from said target area, to enable collecting of a single frame of image data. At least one exposure illuminator is responsive to the in-focus signal, and is arranged to illuminate the target area during an exposure period determined by an exposure control device.

The dataform reader may further include a memory unit coupled to the array and arranged to store image data representative of the image signals and a processing unit coupled to the memory unit and arranged to process stored image data to decode the dataform. The processing unit also provides an end-cycle signal effective to terminate reading of selected sensor elements and operation of the dataform reader cycle upon successful decoding of the dataform, and is coupled to an output device arranged to provide output signals representative of decoded dataform information. The reading of sensor elements is stopped, by terminating at least one of coupling of input power or provision of clock signals providing timing control of sensor reading, in order to conserve power.

Also in accordance with the invention, an imaging method, for use with an imaging system including an array of sensor elements, comprises the following steps:

(a) providing power and clock signals required for reading selected sensor elements to provide image signals;

(b) illuminating a target area with an area of illumination characterized by at least one of a size, brightness, and location which varies with the distance between the array and the target area;

(c) adjusting such distance to cause the area of illumination to be characterized by at least one of a size within a predetermined size range, a brightness within a predetermined brightness range, and a location within a predetermined location range;

(d) providing an in-focus signal when an image signal from at least one sensor element indicates that the area of illumination is characterized as described in step (c);

(e) turning on an exposure illuminator in response to the in-focus signal;

(f) collecting image data from selected sensor elements of the array;

(g) turning off the exposure illuminator and terminating at least one of power and clock signals required for reading of selected sensor elements; and (h) processing image data from sensor elements of the array.

For a better understanding of the invention, together with other and further objects, reference is made to the accompanying drawings and the scope of the invention will be pointed out in the accompanying claims.

DESCRIPTION OF THE INVENTION

Figures 1A, 1B:
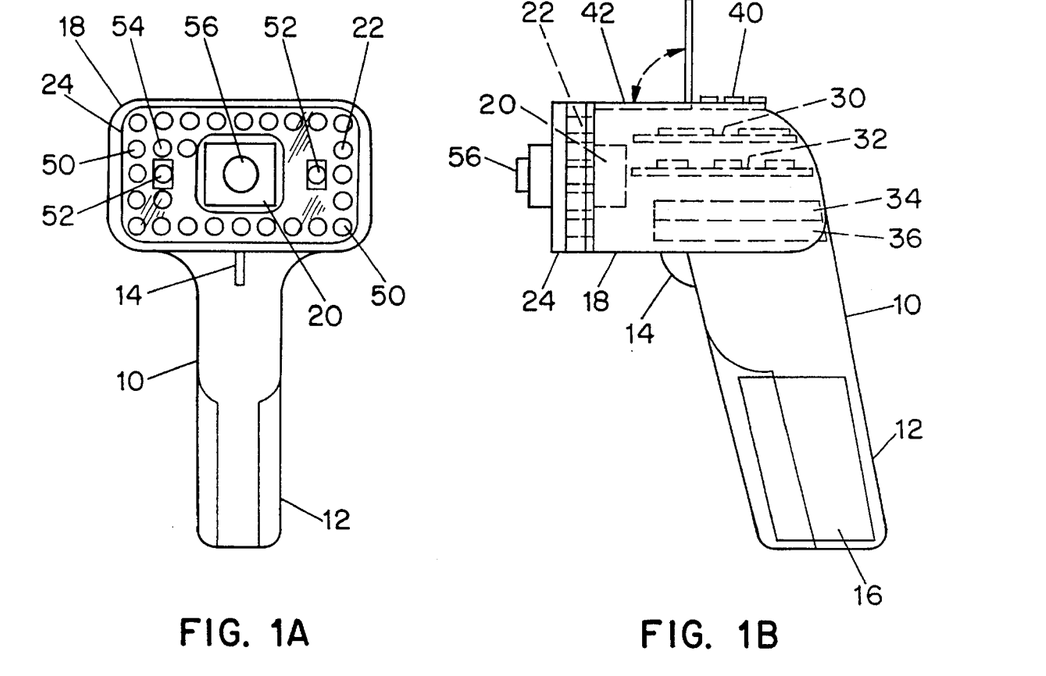
FIGS. 1A, 1B and 1C are respectively front, side and top views of an automatic exposure imaging system in the form of a hand-held dataform reader utilizing the invention.
Figure 1C:
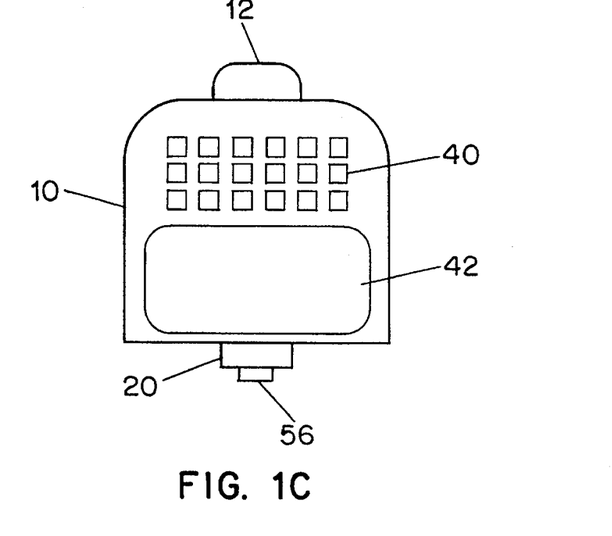

An embodiment of a single frame automatic exposure imaging system, in the form of a dataform reader utilizing the invention, is illustrated in FIGS. 1A, B and C. FIG. 1A is a front conceptual view of the dataform reader 10 and FIGS. 1B and 1C are corresponding side and top views, respectively. A portion of the upper casing is removed in FIG. 1B to provide a simplified view of internal components. Before addressing specific aspects in accordance with the invention, it can be observed that, as shown, the reader includes a suitable impact-resistant plastic case with a hand grip portion 12, a trigger device 14 and battery compartment 16. The dataform reader also includes an upper enclosure portion 18 which, as illustrated in simplified form in FIG. 1B, may include a sensor array assembly 20, illuminator array 22 and illuminator lens 24, each of which will be described in greater detail. FIG. 1B also depicts a processor and memory unit 30 and an input/output (I/O) unit 32, which may take the form of pluggable circuit boards inserted into slots from the rear of the reader 10. Additional slots at 34 and 36 may be utilized to provide additional or extended operating capabilities by enabling insertion of PCMCIA type cards, etc. As further depicted in FIGS. 1B and 1C, the dataform reader 10 may include a data entry keyboard 40 and a display 42, represented as adjustable to different viewing angles. These and other features may be provided by skilled persons using known techniques and types of components, except that features and elements particularly relevant to implementation of the invention are provided as will be further described.

In the illustrated embodiment, there is provided an automatic exposure dataform reader 10 configured to read a dataform (such as a two-dimensional bar code) existing in a target area positioned at a distance from the dataform reader. Thus, for example a bar code can be printed on a label affixed to a package, component or letter and the dataform reader held by an operator, with the front of the reader at a distance from the bar code.

As shown in FIG. 1A, the reader 10 includes an array of illuminators with three different functions. Perimeter illuminators, such as shown at 50, are positioned in a frame type configuration and arranged to illuminate the target area with a border or frame effect which indicates the field of view of the sensor array assembly 20. Focusing illuminators, shown at 52, are arranged in this embodiment to provide angled beams of light which intersect or overlap at a predetermined distance in front of the reader. That distance represents a fixed focus distance, as will be further described. Exposure illuminators, such as shown at 54 and which typically may be included in greater numbers, are arranged to provide a relatively uniform level of target area illumination when turned on during an exposure period for the purpose of reading the dataform (e.g., capturing an image of the dataform in the sensor array). Each of the illuminators may be an appropriate form of device, such as a low cost light emitting diode (LED), arranged to provide the respective levels of illumination determined to be appropriate in applications of the invention. The number, types, arrangement and utilization of the illuminators can be determined as appropriate. Depending upon the application, the perimeter illuminators 50 or focusing illuminators 52 may be used alone or in combination to provide exposure illumination during exposure periods. The illuminator lens 24 may comprise an array configuration including a small lens portion in front of each of the illuminators 50, 52 and 54 in order to provide appropriately focused beam configurations for each of the respective functions already discussed. In the FIG. 1A view a central lens 56 is arranged to focus upon the face of the sensor array contained in assembly 20 illumination reflected from the target area and any included dataform, in order to enable the array to sense the image and provide image signals.

Figure 2:
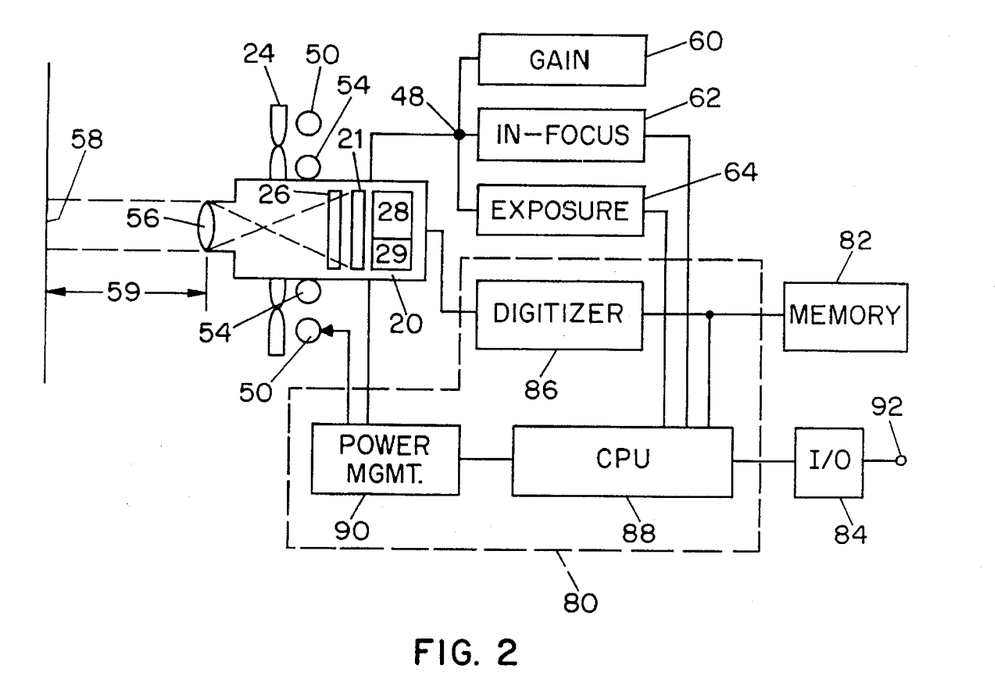
FIG. 2 is a block diagram of portions of the dataform reader with a conceptual side view of optical components of the reader.

Referring now to FIG. 2, there is shown a simplified block diagram of portions of the dataform reader utilizing the invention. A conceptual cross-sectional view of related optical elements is included. As shown, sensor array assembly 20 projects through lens assembly 24 and the array of illuminators 50 and 54 and includes a sensor array 21, optical filter 26 and array control unit 28, with associated clock device 29. Sensor array 21 is positioned behind (to the right of, in this side view) central lens 56 and filter 26. By providing a filter 26 which is transmissive to illumination provided by the illuminators, but effective to reduce transmission in other portions of the ambient light spectrum, the effects produced by ambient light during the exposure period are reduced.

As noted, sensor array assembly 20 may include a two-dimensional array 21 of sensing cells (each utilizing a photodiode and responsive to incident reflected light). Array control unit 28 may typically include vertical and horizontal readout circuits, devices for sensing charge or voltage appearing at individual sensing cells, and an output amplifier device with adjustable gain for coupling image signals from the sensor array assembly 20, as well as clock device 29 for providing timing control of the reading of image signals from selected sensor elements. An arrangement of this type, suitable for use in the dataform reader 10, is shown and described in U.S. patent application Ser. No. 08/258,428 filed Jun. 10, 1994, and having a common assignee herewith. The content of such copending application is hereby incorporated by reference. While other types of sensor array arrangements may be utilized in implementation of the invention, an advantage in use of the type of arrangement of the referenced patent application is that the entire sensor array, plus some or all of the associated gain control, focus sensing and exposure control circuitry, may be enabled to be implemented on a single chip using known application of CMOS technology (or PMOS, NMOS, Bipolar, BiMOS, BiCMOS, or other existing or newly available technology). Use of existing CMOS technology, for example, is effective to provide significant advantages of established production techniques, single chip size, weight and cost advantages and, possibly most importantly, low power consumption (as compared to higher power requirements of prior CCD or other arrangements whereby support circuitry for the sensor array is located off chip).

In FIG. 2, the sensor array is focused, via lens 56, on target area 58 which is at a distance 59 from lens 56. The filter 26 is placed between the lens 56 and the sensor array. Filter 26 can be specified so that it is primarily transmissive only to light in a particular portion or band of the electromagnetic spectrum and is effective to reduce transmission in other portions of the ambient light spectrum (e.g., portions differing from the transmissive band or portion). With this approach, the sensor array can be arranged to be relatively non-responsive to ambient light reflected from the target area.

Figure 3:
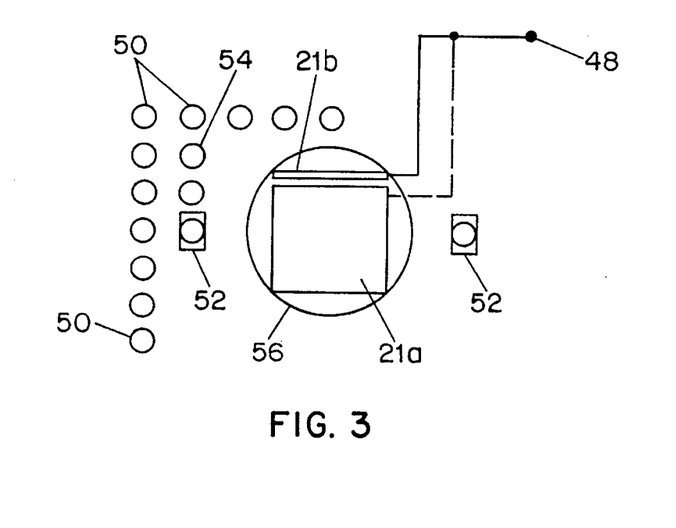
FIG. 3 illustrates details of implementations of a portion of the FIG. 2 system.

FIG. 2 also includes an in-focus sensing device 62 responsive to image signals provided from a plurality of sensor elements and arranged to provide an "in-focus" signal usable to initiate a dataform reading session. The in-focus signal is provided when an area of illumination provided by the focus illuminator or illuminators is characterized by having at least one of (a) a size within a predetermined size range, (b) a brightness within a predetermined brightness range, and (c) a location within a predetermined location range, as represented by such image signals. FIG. 3 indicates two arrangements for providing appropriate image signals to device 62. In FIG. 3, 56 represents an outline of the array focusing lens and 21a represents the outline of an array of sensing elements included in sensor array assembly 20. At 21b is indicated a linear sensor which may comprise one or two rows of sensor elements provided separately from the element array 21a. Linear array 21b is connected to point 48 of FIG. 2 under the control of array control unit 28 (not shown in the simplified representation of FIG. 3).

Figure 4:
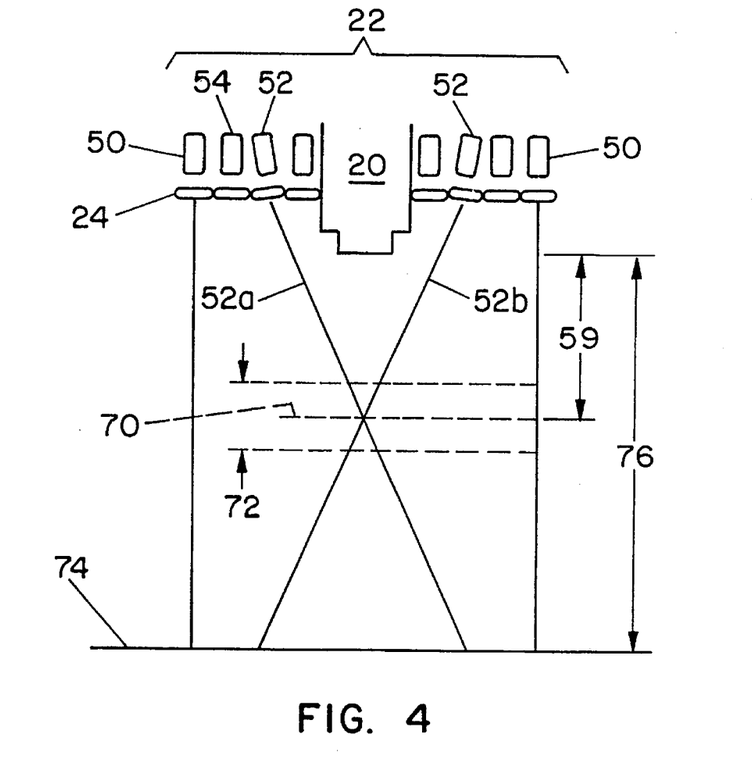
FIG. 4 is a conceptual side view illustrating aspects of an automatic focus sensing system in accordance with the invention.

FIG. 4 is a representation of focus illuminators 52 providing, via lens assembly 24, angled light beams 52a and 52b as previously discussed. As shown, these beams intersect or cross at a distance 59 from the front of the lens 56. At distance 59, there is represented a side view of the plane of focus 70 of the sensor array of array assembly 20 in combination with focusing lens 56 (see also FIG. 2).

Thus, with particular choices of a sensor array configuration and lens, the dataform reader will exhibit an in-focus condition, with an image of the target area and any included dataform accurately focused on the sensor elements of array 21, if the target area lies in the plane 70 which is at a distance 59. Further, the lens 56 can be specified so as to provide a reasonable depth of focus, with the result that an image of the target area will be acceptably focused on the sensor elements for any separation distance within the depth of focus range indicated at 72. Once the distance 59 has been determined for a particular reader design, the beam angles of illuminators 52 can be adjusted to provide beam intersection or overlap at the distance 59, as shown in FIG. 4. With this arrangement, linear sensor 21b of FIG. 3 will initially provide image signals representative of target area illumination by two spots of light located at spaced positions when the target area lies in plane 74 at a distance 76. Then, as the dataform reader is moved closer to the target area so that the target area lies in plane 70 at distance 59, the two spots of light will converge into a single brighter spot at a central location. The image signals from linear array 21b will thus provide information representative of the single brighter spot of illumination and its location, thereby providing information indicative of the in-focus condition. By providing a degree of tolerance on the in-focus image signal indication, the in-focus indication can be adjusted to accommodate the depth of focus range 72. Upon successful distance adjustment (e.g., user movement of a hand-held reader closer or farther from the dataform image) to achieve an in-focus indication, in-focus sensing device 62 is arranged to provide an "in-focus" signal usable for initiating a reading and decoding cycle.

With reference to FIG. 3, the dotted connection between sensing element array 21a of assembly 20 and circuit point 48 indicates an alternative configuration. As shown in FIG. 2, point 48 provides connection to in-focus unit 62 (as well as units 60 and 64). Instead of providing additional sensing elements necessary in order to provide a dedicated linear sensor 21b, it can be arranged to make temporary use of one or more lines of elements of array 21a for focusing purposes, independently of the basic image sensing function of array 21a. With the latter arrangement, the desired in-focus determination can thus be made without the requirement to provide any separate linear sensor such as 21b.

As shown, FIG. 2 further includes an exposure control device 64 responsive to image signals from one or more selected sensor elements and arranged to provide "start" and "stop" signals usable for beginning and terminating an exposure period. Exposure control 64 utilizes the image signals to provide the stop signal in response to reflection of a predetermined level or intensity of illumination. Typically, such predetermined level or intensity will be measured within a period initiated by the start signal provided by the exposure control device and may represent an accumulated representation of the intensity of reflected light over time. By converting image signals received in the period to a voltage representative of accumulated image signal levels, and comparing that voltage to a preset threshold voltage, the stop signal can be generated when the accumulated voltage reaches the threshold voltage, representing a predetermined illumination exposure of the target area.

Figure 5:
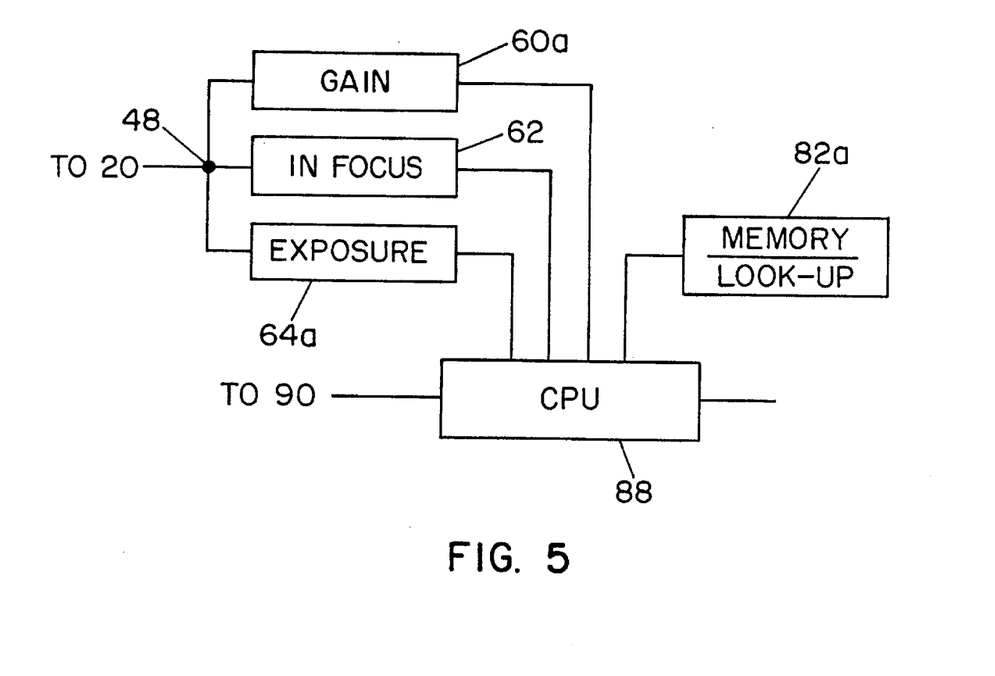
FIG. 5 is a block diagram showing a second embodiment of a portion of the FIG. 2 dataform reader.

In another embodiment illustrated in FIG. 5, the exposure control device sets the duration of the time between the start and stop signals by responding to the illumination intensity as measured by a preset fixed time period sample exposure of one or more selected sensor elements. The image signals from such sensor elements (typically, two rows of sensor elements, as discussed above) will thus be representative of the level of illumination reflected from the target area during the preset sample exposure period. By converting the image signals to a gray level signal, an exposure control signal representative of the appropriate duration of the adjustable exposure period is provided. In order to determine the actual duration of the exposure period represented by the control signal, the exposure control device 64a is coupled to the CPU 88. As shown in FIG. 5, the CPU is arranged to access a look-up table (stored in memory unit 82a) containing exposure period data correlated to gray level signal values. The actual look-up table data can be derived in advance on an empirical or other appropriate basis utilizing the level of reflected light during the preset initial period of predetermined duration as an indication of the exposure time which will be required to enable the capture of usable image data on a single frame activation basis.

As also indicated in FIG. 2, gain control device 60 is arranged to respond to image signals provided from one or more of the sensor elements of array assembly 20, and more particularly to the level of reflected light represented by such image signals, to control image signal amplification. The gain control in this embodiment is achieved by a gain control signal coupled back to the above-referenced adjustable gain output amplifier included in the sensor control unit 28. This enables the amplitude of the image signals provided by the sensor array to be maintained within a predetermined range substantially independently of reflected ambient illumination as represented by amplitude levels of selected image signals.

As illustrated in FIG. 2, this embodiment of the dataform reader in accordance with the invention also comprises a processing unit 80, memory unit 82 and input/output (I/O) module 84. Processing unit 80, which may include a digitizer 86, CPU 88 and power management module 90, receives image signals from sensor array assembly 20 and provides image data in digitized form for storage in memory unit 82. Unit 80 is responsive to the start and stop signals from units 62 and 64 to control the exposure period. As will be further described, during the operating sequence processing unit 80 is also arranged, via power management module 90 coupled to a battery (not shown), to turn on and off the perimeter, focus illuminators 50 and 52, and exposure illuminators and couple power for operation of the sensor array assembly 20. Processing unit 80 is further arranged to implement decoding of a dataform using image data stored in memory unit 82. Upon successful decoding of the dataform, unit 80 also provides an end-cycle signal effective to terminate decoding operation and also to end the reading of sensor elements to provide image signals, by terminating at least one of the coupling of input power and provision of clock signals which are both required in the reading of sensor elements under the control of array control unit 28.

Separately, decoded dataform information is provided to an output device 92, via I/O module 84. The I/O module 84 may be arranged to operate with PCMCIA cards in interface slots 34 and 36 discussed with reference to FIG. 1B, and may be arranged to provide radio, infrared, wired or other signal transmission and reception capabilities. Output device 92 may accordingly be an output port for coupling output signals via a conductor, an antenna or optical device for radio or infrared transmission, or other suitable device, with I/O unit 84 arranged to provide the decoded dataform information in suitable form for use with the particular form of output device. Modem, speech recognition, handwriting recognition, memory and other types of additional capability or peripheral cards may also be inserted in the PCMCIA slots for operation in cooperation with processing unit 80 and I/O module 84 to provide extended and further features. Items not specifically described can be provided by persons skilled in the relevant technologies.

With an understanding of the dataform reader as described, it will be apparent that for dataform reading and in other applications an imaging system provided in accordance with the invention may include automatic gain control, automatic exposure, automatic focus sensing, single frame image capture and other features as described.

OPERATION

Figure 6:
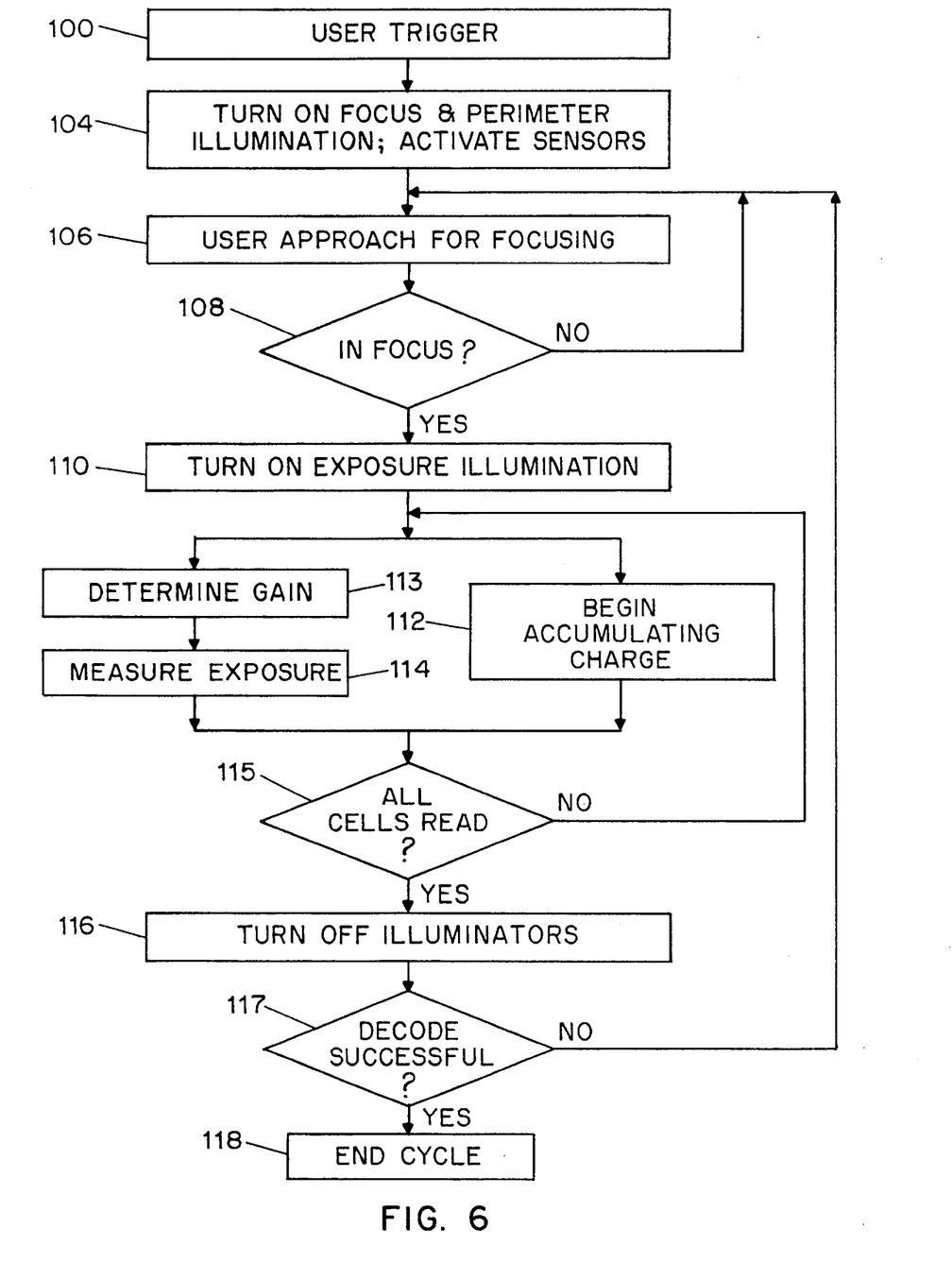
FIG. 6 is an operational flow chart useful in describing operation of the illustrated dataform reader.

With reference now to FIG. 6 there is shown an operational flow chart with reference to operation of an imaging system utilizing the invention. At step 100, a user activates trigger device 14 of dataform reader 10 shown in FIG. 1B. At step 104, perimeter illuminators 50 and focus illuminators 52 are turned on and reading of sensor elements is initiated. At step 106, the user adjusts the distance between the dataform reader 10 and the target area to achieve a separation distance within range 72 in FIG. 4, at which point the areas of illumination intersect and merge into a single smaller, brighter area or spot of illumination having a central location. At step 108, the focus condition achieved in step 106 is monitored on the basis of image signals from a linear array of sensors indicative of whether the area of illumination is characterized by at least one of (a) a size within a predetermined size range, (b) a brightness within a predetermined brightness range, and (c) a location within a predetermined location range, or any combination of the three, as will occur as the two illumination areas, as provided on the target area by beams 52a and 52b in FIG. 4, overlap and merge. For two round spots of illumination, the spots will thus become concentric when focused and this minimum size condition can be detected in a variety of ways, including detecting the relative positions of the two spots within the field of view. When such illumination area merge is achieved as characterized, an "in-focus" signal is effective at step 110 to turn on all illuminators of the exposure array (e.g., illuminators 50 or illuminators 50 and 52, depending upon the particular configuration).

Upon turning on the exposure illuminators, the exposure control device sends a start signal to sensor array assembly 20 which is effective to reset any accumulated charge on the sensors to a reference charge. The photo sensors immediately begin accumulating a new charge as indicated at step 112. Simultaneously the exposure control device and the gain control device periodically measure accumulated charge on a sample of photodetectors at steps 113 and 114. The gain control device at step 113 uses sample image data to select an appropriate amplitude gain and offset signal to apply to the sensor array amplifier in array control unit 28. At step 114, the exposure control device monitors the sample image data and when the sample image data indicates that the level of reflected light from the target area, on a cumulative basis, has reached a predetermined level, the exposure control device generates a stop signal. In response to the stop signal the accumulated charge on the exposed sensor is measured and converted to a voltage signal. Known types of sensor arrays utilizing two-dimensional arrays of photosensitive cells are structured so that sensor elements are grounded to a reference charge level and then permitted to accumulate charge during an exposure period. Then, pursuant to a reading process, either all or selected cells (e.g., one half of the cells, in an interlaced configuration, or one line in a row-by-row readout arrangement) are sampled simultaneously to measure accumulated charge, with data temporarily stored and read out row-by-row sequentially using a shift register arrangement. At step 115, if no more cells require readout (e.g., all cells have been sampled simultaneously) the exposure illuminators are turned off. However, if the configuration is such that additional cells remain to be read, in this embodiment the system will return to steps 112 and 113. The exposure control device will then generate a start signal to initiate an exposure period for the next group of cells, which will be read out at the end of that exposure period. After reading a complete frame, the system will advance from step 115 to step 116 at which point the exposure illuminators are turned off.

At step 117, processor unit 80 attempts to decode the dataform utilizing image data consisting of image signals from array assembly 20 which have been digitized and stored in memory unit 82. If decoding is successful, at step 118 the decoded dataform information is made available for transmission out of the dataform reader 10 and an end-cycle signal is provided to terminate the reading cycle by turning off at least one of input power and clock signals as utilized by the array control unit 28. If the decoding is not successful, at step 117 the reading cycle is reactivated or repeated starting at step 104, as indicated in FIG. 6.

It should be noted that in step 117, if a dataform is in fact present in the captured image of the target area, it will typically be necessary to locate the dataform within the image to enable decoding. Location of the dataform image can be accomplished as described in U.S. Pat. No. 5,304, 787, entitled "LOCATING 2-D BAR CODES", issued Apr. 19, 1994, and having a common assignee.

Consistent with the foregoing, an imaging method, for use with an imaging system including an array of sensing elements, includes all or selected ones of the following steps, particularly in application of the invention to the reading of a dataform:

(a) positioning in front of the array an optical filter transmissive to light from an exposure illuminator (described below) and effective to reduce transmission in other portions of the ambient light spectrum;

(b) initiating reading of selected sensor elements by providing input power and clock signals required for such reading;

(c) illuminating a target area with an area of illumination characterized by at least one of a size, a brightness and location which varies with the distance between the array and the target area;

(d) adjusting such distance to cause the area of illumination to be characterized by at least one of a size within a predetermined size range and a brightness within a predetermined brightness range and a location within a predetermined location range;

(e) providing an in-focus signal when an image signal from at least one sensing element indicates that the illumination is characterized as described in step (d);

(f) turning on an exposure illuminator in response to the in-focus signal;

(g) utilizing image signals from selected sensing elements, as representative of the level of reflected light, to provide a gain control signal to control the amplification of image signals from the array;

(h) providing a stop signal when image signals from at least one sensing element indicate reflection of a predetermined level of illumination from the target area;

(i) upon complete exposure of the sensor cells, turning off the exposure illuminator; and (j) processing image data, representing image signals from the array which have been digitized and stored in memory, to decode the dataform;

(k) upon successful decoding of the dataform, providing an end-cycle signal, ending sensor reading by terminating at least one of the input power and clock signals, and coupling decoded dataform information to an I/O module; and (l) if decoding is unsuccessful, repeating the method from step (d).

Figure 7:
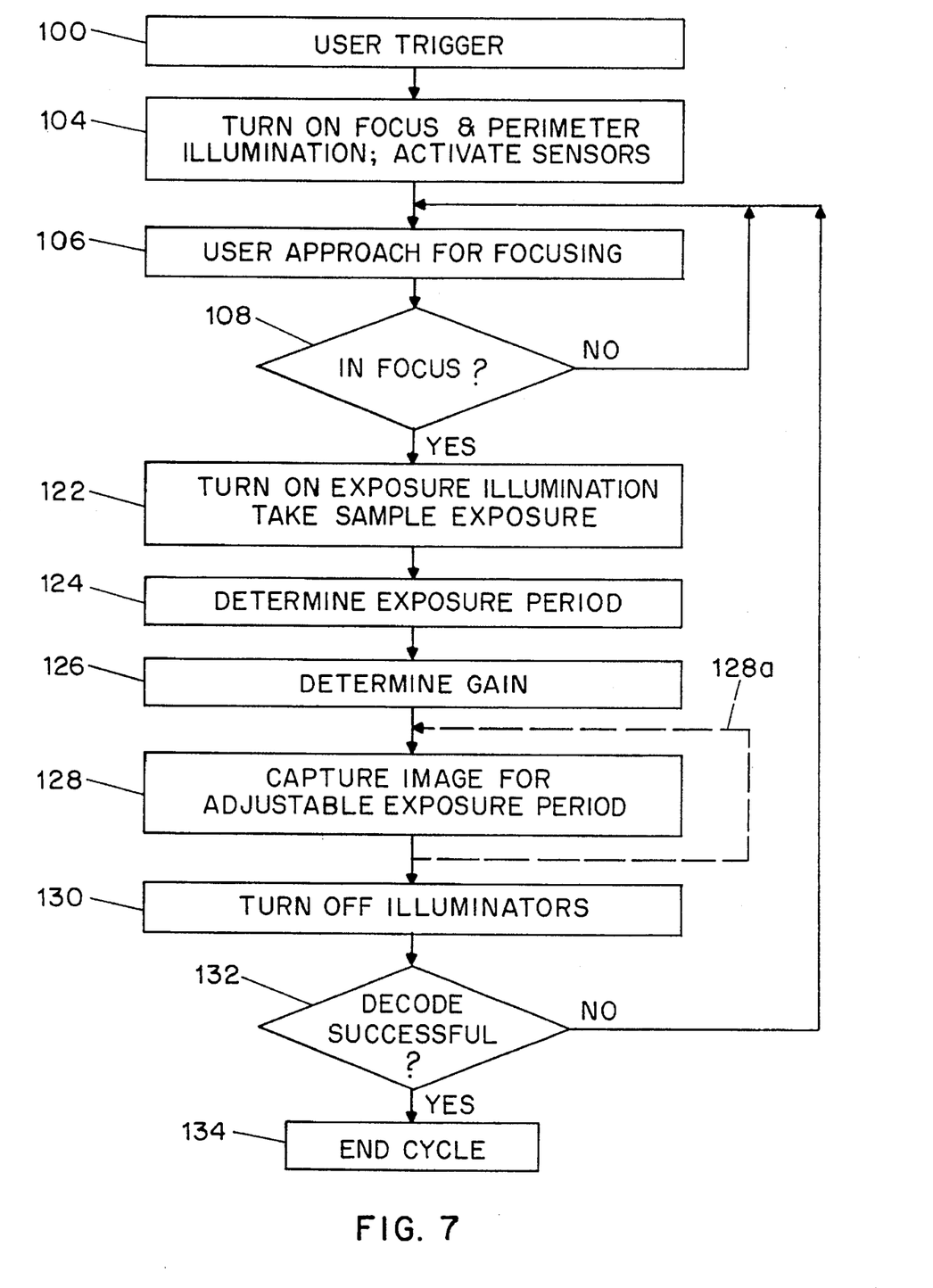
FIG. 7 is a flow chart useful in describing operation of the second embodiment of the invention.

FIG. 7 shows a flowchart corresponding to the second embodiment of this invention. Steps 100 to 108 operate the same as described in the previous embodiment. After determining the in-focus condition at 108 and generating an in-focus signal, the exposure illuminators are turned on for a preset sample exposure period and image data is collected at step 122. To do this, the exposure control device generates a sample exposure start signal whereby selected photo sensors are grounded to a reference charge and begin accumulating a sample charge. At the end of the preset exposure period, the exposure control device, a portion of which could simply be a timer for this purpose, generates a stop signal whereby the sample accumulated charge on each selected sensor is read as image data. At 124, in response to image data collected during the sample exposure, the exposure control device determines the appropriate duration of an adjustable exposure period. As discussed, the appropriate duration of the exposure period may be determined by accumulating, via exposure unit 64a of FIG. 5, image data from the selected sensors and referring a resulting voltage level to a look up table stored in memory 82a.

It will be appreciated that the level of reflected illumination will be determined by, among other possible factors, the reflectance of the target area. Such reflectance may be substantially higher or lower than an expected or typical value in certain conditions of surface texture or coloration. Accordingly, it may be desirable to control the gain of image signals from the array, as well as the exposure period. This result can be provided by accumulating, via gain unit 60a of FIG. 5, image data from selected sensor elements and referring a signal representative thereof to a look-up table in memory 82a which, for particular levels of illumination reflected during the preset initial period, provides values for adjustment of image signal output gain. With an understanding of the invention, skilled persons will be enabled to provide appropriate look-up tables utilizing empirical or other techniques. FIG. 7 thus provides step 126 for using the sample image data to determine an appropriate gain adjustment to apply to the output amplifier of the sensor array assembly.

At 128 the device captures a single frame of image data. As discussed above, if the sensor array is structured so that all photosensor cells are referenced, exposed, and sampled in parallel to generate a full frame of data, then step 128 will consist of only one cycle of grounding, exposing and sampling the accumulated charge on the cells. At step 130 the exposure illuminator is turned off. As further discussed, if the photosensor array is structured so that only selected sensor elements may be read in parallel in a single cycle, the exposure control device will generate a plurality of start and stop signals corresponding to the predetermined exposure time as indicated by dashed path 128, as appropriate to complete the reading of all cells. After collecting a full frame of data, at 130 the exposure illuminators are turned off. If the data form is successfully decoded at 132 the data transmission and termination of the reading cycle, including termination of at least one of the input power and clock signals utilized by the array control device, proceed at step 134.

Simplicity and efficiency of operation are enhanced by automatic gain control, automatic no-shutter exposure control and automatic in-focus sensing on a hand-held, user positioned basis. Operative advantages include full resolution, full frame image capture on a single frame, automatic exposure (e.g., shutter speed) basis regardless of ambient light levels. Necessary gain adjustment can be sensed in a period of the order of 100 microseconds. With single frame image capture, continuous image data transfer and data processing is avoided. In addition to hand-held applications, the simplicity, cost and reliability advantages of imaging systems in accordance with the invention are readily adapted for use in automated, fixed-position, non-attended applications for dataform reading and other imaging purposes. Additionally, the invention provides the advantage that, using available CMOS or other technology, the sensor array assembly 20 and all or major portions of units 60, 62, 64 and 80 can be fabricated on a single chip enhancing small size, light weight, ease of packaging and low power consumption (e.g., as low as one-tenth the power consumption of comparable CCD array components). This enables provision of a small, lightweight, long operating period hand-held battery operated unit suitable for reading dataforms or other image capture applications.

While there have been described the currently preferred embodiments of the invention, those skilled in the art will recognize that other and further modifications may be made without departing from the invention and it is intended to claim all modifications and variations as fall within the scope of the invention.

What is claimed is:

1. An automatic exposure imaging system, usable as a dataform reader to read a dataform in a target area at a distance from said reader, comprising:

a plurality of sensor elements which are readable to provide image signals and at least some of which are positioned in a two-dimensional array;

at least one focus illuminator arranged to illuminate said target area with an area of illumination characterized by at least one of a size, a brightness and a location which varies with the distance between the array and the target area;

a user trigger device arranged to activate said at least one focus illuminator and initiate reading of selected sensor elements;

an in-focus sensing device responsive to image signals from at least one of said sensor elements and arranged to provide an in-focus signal when said area of illumination is characterized by at least one of a size within a predetermined size range, a brightness within a predetermined brightness range and a location within a predetermined location range;

a gain control device responsive, in a period after said in-focus signal, to the level of reflected light as represented by image signals from at least one of said sensor elements and arranged to control image signal amplification;

an exposure control device, responsive to image signals from at least one of said sensor elements, and arranged to provide a start signal in response to said in-focus signal and a stop signal in response to reflection of a predetermined level of illumination from said target area;

at least one exposure illuminator responsive to said start signal and to said stop signal, and arranged to illuminate said target area during an exposure period determined by said start and stop signals;

a memory unit coupled to said array and arranged to store image data representative of said image signals;

a processing unit coupled to said memory unit and arranged to process stored image data to decode said dataform, and to provide an end-cycle signal effective to terminate reading of selected sensor elements and operation of the dataform reader, upon successful decoding of the dataform; and an output device coupled to said processing unit and arranged to provide output signals representative of decoded dataform information.

2. An imaging system as in claim 1, additionally comprising an optical filter positioned in front of said array, transmissive to illumination from said exposure illuminator and effective to reduce transmission in other portions of the ambient light spectrum.

3. An imaging system as in claim 1, wherein said gain control device provides a signal used to control the gain of image signals provided from sensor elements included in said two-dimensional array.

4. An imaging system as in claim 1, wherein said at least one focus illuminator comprises two focus illuminators providing respective beams of light which intersect in front of the array at a focus distance representative of a fixed focus plane of said array.

5. An imaging system as in claim 4, additionally comprising a central focusing lens positioned in front of said array and arranged to provide a plane of focus at said focus distance, with a depth of focus range extending about said focus distance.

6. An imaging system as in claim 4, wherein said in-focus sensing device is arranged to sense at least a predetermined degree of convergence of the illumination areas provided on said target area by said beams of light.

7. An imaging system as in claim 1, wherein said at least one exposure illuminator comprises an array of illuminator devices arranged to provide a predetermined level of illumination across the target area when said array and said image are separated by a predetermined distance.

8. An imaging system as in claim 7, additionally comprising a lens array assembly for providing predetermined focusing of light from said array of illuminating devices.

9. An imaging system as in claim 7, wherein said illuminator devices are light emitting diodes.

10. An imaging system as in claim 1, wherein said exposure control device develops a voltage representative of the cumulative value of image signals over a period of time and provides said stop signal when said voltage reaches a predetermined threshold voltage.

11. An automatic exposure system, comprising:
a plurality of sensor elements which are readable to provide image signals representative of reflected illumination and at least some of which are positioned in a two-dimensional array;
at least one exposure illuminator including an array of illuminator devices arranged to provide a predetermined level of illumination across a selected target area when said array and said target area are separated by a predetermined distance; and
an exposure control device responsive to image signals from at least one of said sensor elements and arranged to provide an exposure stop signal in response to a predetermined level of reflected illumination, said exposure stop signal being utilized to turn off said at least one exposure illuminator, which provides illumination resulting in said reflected illumination.

12. An automatic exposure system as in claim 11, wherein said exposure stop signal is utilized to trigger reading of image data from one of the following: at least one sensor element, and all sensor elements.

13. An automatic exposure system as in claim 11, additionally comprising an optical filter positioned in front of said array, transmissive to illumination from said exposure illuminator and effective to reduce transmission in other portions of the ambient light spectrum.

14. An automatic exposure system as in claim 11, wherein said sensor elements are arranged to accumulate charge representative of said reflected illumination and said exposure stop signal is provided by said exposure control device when said charge is accumulated to a predetermined level by said at least one of the sensor elements.

15. An automatic exposure system as in claim 14, wherein said at least one of the sensor elements is arranged to have a predetermined initial charge accumulation at the start of an exposure period.

16. An automatic exposure system as in claim 11, wherein said exposure control device develops a voltage representative of the cumulative value of image signals over a period of time and provides said exposure stop signal when said voltage reaches a predetermined threshold voltage.

17. An automatic exposure imaging system, comprising:
a plurality of sensor elements which are readable to provide image signals and at least some of which are positioned in a two-dimensional array;
at least one focus illuminator arranged to illuminate a target area with an area of illumination characterized by at least one of a size, a brightness and a location which varies with the distance between the array and the target area;
an in-focus sensing device responsive to image signals from at least one of said sensor elements and arranged to provide an in-focus signal when said area of illumination is characterized by at least one of a size within a predetermined size range, a brightness within a predetermined brightness range and a location within a predetermined location range;
an exposure control device, responsive to image signals from at least one of said sensor elements, and arranged to provide a start signal in response to said in-focus signal and a stop signal in response to reflection of a predetermined level of illumination from said target area; and
at least one exposure illuminator responsive to said start signal and to said stop signal, and arranged to illuminate said target area during an exposure period determined by said start and stop signals.

18. An imaging system as in claim 17, additionally comprising an optical filter positioned in front of said array, transmissive to illumination from said exposure illuminator and effective to reduce transmission in other portions of the ambient light spectrum.

19. An imaging system as in claim 17, wherein said at least one focus illuminator comprises two focus illuminators providing respective beams of light which intersect in front of the array at a focus distance representative of a fixed focus plane of said array.

20. An imaging system as in claim 19, additionally comprising a central focusing lens positioned in front of said array and arranged to provide a plane of focus at said focus distance, with a depth of focus range extending about said focus distance.

21. An imaging system as in claim 19, wherein said in-focus sensing device is arranged to sense at least a predetermined degree of convergence of the illumination areas provided on said target area by said beams of light.

22. An imaging system as in claim 17, wherein said at least one exposure illuminator comprises an array of illuminator devices arranged to provide a predetermined level of illumination across the target area when said array and said image are separated by a predetermined distance.

23. An imaging system as in claim 17, additionally comprising a lens array assembly for providing predetermined focusing of light from said array of illuminating devices.

24. An imaging system as in claim 17, wherein said illuminator devices are light emitting diodes.

25. An imaging system as in claim 17, wherein said exposure control device develops a voltage representative of the cumulative value of image signals over a period of time and provides said stop signal when said voltage reaches a predetermined threshold voltage.

26. An imaging system, comprising:
a plurality of sensor elements which are readable to provide image signals and at least some of which are positioned in a two-dimensional array;
at least one focus illuminator arranged to illuminate a target area with an area of illumination characterized by at least one of a size, a brightness and a location which varies with the distance between the array and the target area; and
an in-focus sensing device responsive to image signals from at least one of said sensor elements and arranged to provide an in-focus signal when said area of illumination is characterized by at least one of a size within a predetermined size range, a brightness within a predetermined brightness range and a location within a predetermined location range.

27. An imaging system as in claim 26, wherein said at least one focus illuminator comprises two focus illuminators providing respective beams of light which intersect in front of the array at a focus distance representative of a fixed focus plane of said array.

28. An imaging system as in claim 26, additionally comprising a central focusing lens positioned in front of said array and arranged to provide a plane of focus at said focus distance, with a depth of focus range extending about said focus distance.

29. An imaging system as in claim 26, wherein said in-focus sensing device is arranged to sense at least a predetermined degree of convergence of the illumination areas provided on said target area by said beams of light.

30. An automatic exposure imaging system comprising:
   a plurality of sensor elements which are readable to provide image signals and at least some of which are positioned in a two-dimensional array;
   at least one exposure illuminator arranged to illuminate a target area during a preset initial period and during an adjustable exposure period; and
   an exposure control device responsive to image signals, from at least one of said sensor elements, which are representative of the level of illumination reflected from said target area during said preset initial period, said exposure control device arranged to provide an exposure control signal representative of the duration of said adjustable exposure period.

31. An automatic exposure imaging system comprising:
   a plurality of sensor elements which are readable to provide image signals and at least some of which are positioned in a two-dimensional array;
   at least one exposure illuminator arranged to illuminate a target area during a preset initial period and during an adjustable exposure period;
   an exposure control device responsive to image signals, from at least one of said sensor elements, which are representative of the level of illumination reflected from said target area during said preset initial period, said exposure control device arranged to provide an exposure control signal representative of the duration of said adjustable exposure period;
   a memory unit arranged to store a look-up table of exposure periods correlated to exposure control signal value; and
   a processing unit coupled to said exposure control device and said memory unit and responsive to said exposure control signal to utilize said look-up table to determine the duration of said adjustable exposure period.

32. An automatic exposure imaging system as in claim 30, wherein said at least one exposure illuminator includes a plurality of illuminators at least one of which is turned on during said preset initial period and at least one of which is turned on during said adjustable exposure period.

33. An automatic exposure imaging system comprising:
   a plurality of sensor elements which are readable to provide image signals and at least some of which are positioned in a two-dimensional array;
   at least one exposure illuminator arranged to illuminate a target area during a preset initial period and during an adjustable exposure period; and
   an exposure control device responsive to image signals, from two rows of said sensor elements positioned in said two-dimensional array, which are representative of the level of illumination reflected from said target area during said preset initial period, said exposure control device arranged to provide an exposure control signal representative of the duration of said adjustable exposure period;
   said exposure control device arranged to determine said level of illumination by summing the pixel values represented by image signals from all sensors included in said two rows of sensor elements.

34. An automatic exposure imaging system as in claim 31, wherein said sensor elements include charge storage devices which, under the control of said processing unit, are discharged prior to the start of said adjustable exposure period.

35. An automatic exposure imaging system as in claim 34, wherein, under the control of said processing unit, said at least one exposure illuminator is first turned on for said preset initial period and subsequently turned on for said adjustable exposure period after said charge storage devices are discharged.

36. An automatic exposure imaging system as in claim 35, wherein image data representative of image signals sensed by said sensor elements during said adjustable exposure period is coupled to said memory unit in preparation for further processing.

37. An automatic exposure imaging system comprising:
   a plurality of sensor elements which are readable to provide image signals and at least some of which are positioned in a two-dimensional array;
   at least one exposure illuminator arranged to illuminate a target area during a preset initial period and during an adjustable exposure period;
   an exposure control device responsive to image signals, from at least one of said sensor elements, which are representative of the level of illumination reflected from said target area during said preset initial period, said exposure control device arranged to provide an exposure control signal representative of the duration of said adjustable exposure period;
   at least one focus illuminator arranged to illuminate a target area with an area of illumination characterized by at least one of a size, a brightness and location which varies with the distance between the array and the target area; and
   an in-focus sensing device responsive to image signals from at least one of said sensor elements and arranged to provide an in-focus signal effective to initiate said preset initial period of illumination by said exposure illuminator when said area of illumination is characterized by at least one of a size within a predetermined size range, a brightness with a predetermined brightness range and a location within a predetermined location range.

38. An automatic exposure imaging system as in claim 30, additionally comprising a gain control device responsive to the level of reflected light as represented by image signals from at least one of said sensor elements and arranged to control image signal amplification.

39. An imaging method, for use with an imaging system including an array of sensor elements, comprising the following steps:
   (a) illuminating a target area with an area of illumination characterized by at least one of a size, a brightness and a location which varies with the distance between the array and the target area;

(b) adjusting said distance to cause said area of illumination to be characterized by at least one of a size within a predetermined size range, a brightness within a predetermined brightness range and a location within a predetermined location range;

(c) providing an in-focus signal when an image signal from at least one sensor element indicates that said area of illumination is characterized as described in step (b);

(d) turning on an exposure illuminator in response to said in-focus signal;

(e) providing a stop signal when image signals from at least one sensor element indicate reflection of a predetermined level of illumination from said target area;

(f) turning off said exposure illuminator in response to said stop signal; and (g) processing image data from sensor elements of said array.

40. An imaging method as in claim 39, wherein step (a) additionally includes initiating reading of selected sensor elements to provide image signals, and additionally including the following step:

(h) terminating reading of selected sensor elements.

41. An imaging method as in claim 40, wherein step (h) comprises terminating reading of selected sensor elements by causing the termination of at least one of the following: the providing of input power required for such reading, the providing of clock signals required for timing control of such reading.

42. An imaging method as in claim 39, additionally including an initial step as follows:

(x) positioning in front of said array of sensor elements an optical filter transmissive to light from said exposure illuminator and effective to reduce transmission in other portions of the ambient light spectrum.

43. An imaging method as in claim 39, additionally including an additional step between steps (d) and (e) as follows:

(y) utilizing image signals from at least one sensor element, as representative of the level of reflected ambient light, to provide a gain control signal to control amplification of image signals from said array.

44. An imaging method as in claim 39, wherein step (g) includes processing said image data to decode a dataform included in said target area, and said method includes the additional steps of:

(i) providing an end-cycle signal effective to terminate operation of the method upon successful decoding of the dataform; and (ii) coupling the decoded dataform information to an output device for further utilization.

45. An imaging method as in claim 39, wherein in step (a) said target area is illuminated with an area of illumination comprising spots of illumination provided by two angled light beams which intersect at an in-focus distance in front of the array.

46. An imaging method as in claim 45, wherein step (b) comprises adjusting said distance to cause said two spots of illumination incident on said target area to merge to at least a predetermined degree.

47. An imaging method as in claim 46, wherein step (c) comprises providing said in-focus signal when said image signal indicates that said two spots of illumination are merged to at least said predetermined degree.

48. An imaging method as in claim 39, wherein step (e) comprises providing said stop signal when a voltage developed as representative of the cumulative value of said image signals reaches a threshold value.

49. An imaging method, for use with an imaging system including an array of sensing elements, comprising the following steps:

(a) illuminating a target area with an area of illumination characterized by at least one of a size, a brightness and a location which varies with the distance between the array and the target area;

(b) adjusting said distance to cause said area of illumination to be characterized by at least one of a size within a predetermined size range, a brightness within a predetermined brightness range and a location within a predetermined location range; and (c) providing an in-focus signal when an image signal from at least one sensing element indicates that said area of illumination is characterized as described in step (b).

50. An imaging method as in claim 49, wherein in step (a) said target area is illuminated with an area of illumination comprising spots of illumination provided by two angled light beams which intersect at an in-focus distance in front of the array.

51. An imaging method as in claim 50, wherein step (b) comprises adjusting said distance to cause said two spots of illumination incident on said target area to merge to at least a predetermined degree.

52. An imaging method as in claim 51, wherein step (c) comprises providing said in-focus signal when said image signal indicates that said two spots of illumination are merged to at least said predetermined degree.

53. An imaging method, for use with an imaging system including an array of sensing elements, comprising the following steps:

(a) turning on an exposure illuminator for a preset initial period;

(b) determining the level of illumination sensed by at least one sensing element in said preset initial period; and (c) utilizing said level to determine an adjustable exposure period.

54. An imaging method, for use with an imaging system including an array of sensing elements, comprising the following steps:

(a) turning on an exposure illuminator for a preset initial period;

(b) determining the level of illumination sensed by at least one sensing element in said preset initial period; and (c) utilizing a look-up table of exposure periods to determine an adjustable exposure period on the basis of said level.

55. An imaging method as in claim 54, wherein said look-up table includes a portion usable to provide said adjustable exposure period and a portion usable to provide gain control values for adjusting the gain of image signals provided by said sensing elements.

* * * * *